Dec. 5, 1967  B. P. ALLERSMA  3,355,845
TARPAULIN FOR HARVESTED AGRICULTURAL PRODUCTS STANDING
IN THE FIELD IN SHEAVES OR HEAPS
Filed April 20, 1965
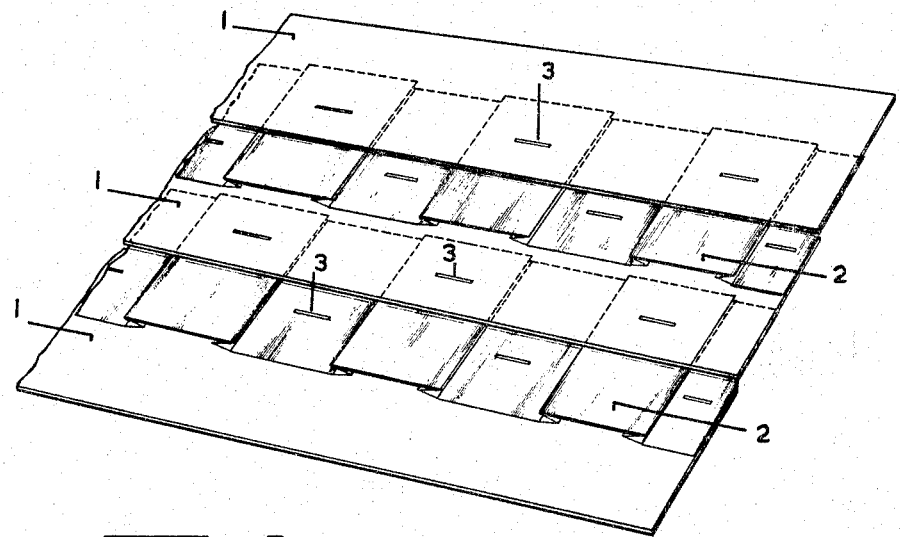
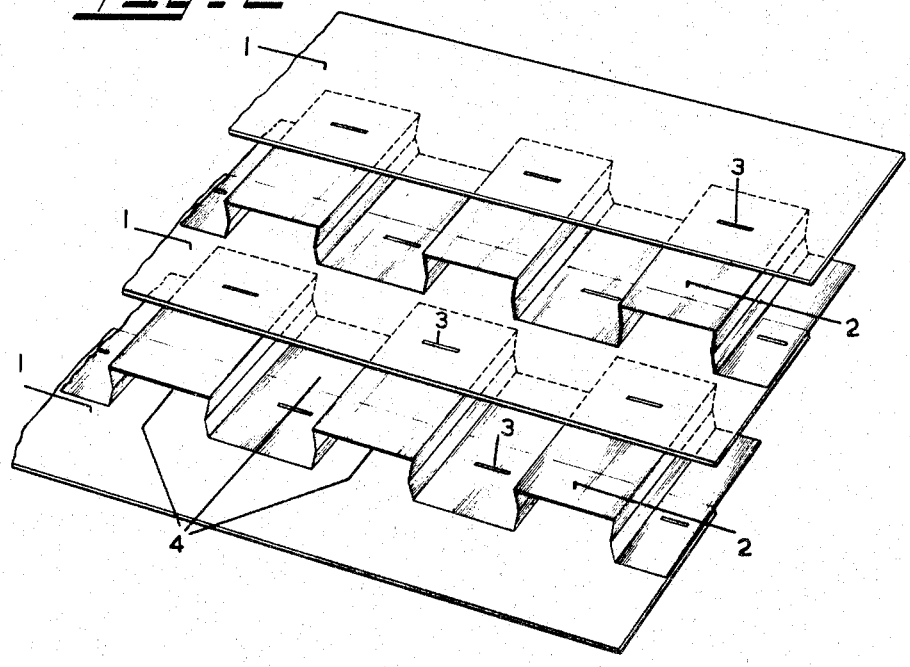
INVENTOR.
BARTELD PIETER ALLERSMA
BY
Albert M. Parker United States Patent Office 3,355,845
Patented Dec. 5, 1967

3,355,845
TARPAULIN FOR HARVESTED AGRICULTURAL PRODUCTS STANDING IN THE FIELD IN SHEAVES OR HEAPS
Barteld Pieter Allersma, Noordpolder 9, Den Andel, Netherlands
Filed Apr. 20, 1965, Ser. No. 449,599
1 Claim. (Cl. 52—5)

ABSTRACT OF THE DISCLOSURE

A ventilated tarpaulin adapted for covering agricultural products standing in the field in sheaves or heaps, said tarpaulin being made of an assembly of two sets of overlapping, interconnected, longitudinally extending, transversely spaced strips disposed in echelon so that successive strips overlap for substantial portions of their widths. The strips of one set are folded transversely to their lengths to form alternating upwardly and downwardly convex pleats. The strips of the other set are generally straight when the tarpaulin is extended to lie flat. Means are provided for connecting the convex portions of the pleats of the strips of the first set to the portions of the second strips which such pleats overlap.

---

Many types of removable covers for agricultural products have been proposed in the art, among which of the type having a plurality of interconnected strips. These, however, have the drawback that they are difficult to handle an account of their rather rigid construction, as a result of which, they will not find much application.

It is an object of the present invention to remove this drawback by means of an improved construction of a tarpaulin of the subject type.

To that effect the tarpaulin according to the invention consists of strips of thin flexible material, and, in the longitudinal direction of the tarpaulin, a generally straight strip each time alternates with a strip which is pleated in the transverse direction of the cover.

In illustration of the invention, one embodiment of the tarpaulin will be described, by way of example, with reference to the accompanying drawings.

FIGURE 1 is a showing of a portion of the tarpaulin in the inoperative position;

FIGURE 2 shows a portion of the tarpaulin in the operative position.

Referring to the drawings, the tarpaulin is composed of spaced strips 1 and 2 which extend in the longitudinal direction of the tarpaulin, the strips 1 and 2 alternating with each other and being disposed in echelon so that successive strips overlap for substantial portions of their widths. The strips 1 are all generally straight, and the strips 2 are folded in the transverse direction of the tarpaulin to form longitudinally spaced pleats therein.

Means are provided for connecting the convex portions of the pleats of the strips 2 of a first set to the portions of the strips 1 of the second set which such pleats overlap. Such connecting means are shown generally at 3; means 3 may be, for example, stitches or staples.

When the tarpaulin is not in use, it has the flat shape as shown in FIGURE 1, and in this form it can be easily folded or rolled up to take up a small volume.

When the tarpaulin is laid from the top of a sheaf or heap of agricultural products over the side of such sheaf or heap with the channels generally vertical, open side downwards the tarpaulin will assume the shape shown in FIGURE 2 through cavity, the strips 2 being deformed to create ventilating channels 4, so that the access of air to the covered agricultural products remains possible, but the products are protected from the harmful influence of rain.

The manufacture of the tarpaulin may be effected so cheaply that, if so desired, the tarpaulin may be made of the disposable type. The straight strips 1 may consist of prepared paper, and the pleated strips 2 may be made of a film of synthetic material. However, there is naturally a great degree of freedom in the selection of the material of which the overlapping strips are made. The manner in which the strips are interconnected also admits of a large number of variants.

I claim:

A ventilated tarpaulin adapted for covering agricultural products standing in the field in sheaves or heaps, comprising a plurality of first longitudinally extending transversely spaced strips of thin flexible material, said first strips being disposed at least substantially parallel and being folded transversely to their lengths to form alternating upwardly and downwardly convex pleats, a plurality of second longitudinally extending transversely spaced strips of thin flexible material, said second strips being disposed at least substantially parallel and being generally straight when the tarpaulin is extended to lie flat, the first and second strips alternating with each other and being disposed in echelon so that successive strips overlap for substantial portions of their widths, and means connecting the convex portions of the pleats of the first strips to the portions of the second strips which such pleats overlap.

References Cited

UNITED STATES PATENTS

| 424,955 | 4/1890 | Broughton | 52—5 |
| 1,095,848 | 5/1914 | Wright | 52 X |
| 2,312,301 | 3/1943 | Turner | 161—137 X |
| 2,879,554 | 3/1959 | Wheeler | 161—104 |

FOREIGN PATENTS

| 704,155 | 3/1941 | Germany. | |

FRANK L. ABBOTT, *Primary Examiner.*
M. O. WARNECKE, R. A. STENZEL,
*Assistant Examiners.*